United States Patent [19]

Bahrenburg

[11] 4,267,699
[45] May 19, 1981

[54] FREEZE ISOLATION SEAL

[76] Inventor: Harry H. Bahrenburg, 11 Sherman Ct., Bethpage, N.Y. 11714

[21] Appl. No.: 13,087

[22] Filed: Feb. 21, 1979

[51] Int. Cl.³ .............................................. F25C 1/00
[52] U.S. Cl. .......................................... 62/66; 62/293; 285/45; 403/344; 138/97
[58] Field of Search ........... 62/293, 66, 259 R, 259 B; 285/41, 45; 403/344; 138/97, 99

[56] References Cited

U.S. PATENT DOCUMENTS

| | | | |
|---|---|---|---|
| 317,794 | 5/1885 | Jackson | 285/45 X |
| 3,427,051 | 2/1969 | White et al. | 285/45 X |
| 3,550,638 | 12/1970 | Smith | 138/99 |
| 3,559,423 | 2/1971 | Scheidler | 62/293 |
| 3,742,723 | 7/1973 | Grise | 62/293 |
| 3,917,424 | 11/1975 | Zugel | 403/344 X |
| 3,922,008 | 11/1975 | Stiner et al. | 285/41 |
| 4,096,886 | 6/1978 | Daspit | 138/99 |
| 4,112,706 | 9/1978 | Brister | 62/293 X |

*Primary Examiner*—Albert J. Makay
*Assistant Examiner*—William E. Tapolcai, Jr.
*Attorney, Agent, or Firm*—Brooks, Haidt, Haffner & Delahunty

[57] ABSTRACT

Cold gas is used to freeze liquid in a pipe without directly encountering the pipe wall, which is surrounded and reinforced by a clamp assembly within a housing through which the gas flows. Gas temperature at an outlet from the housing is monitored for control of the rate of gas to provide a uniform cool down rate, avoiding thermal shock to the pipe.

25 Claims, 11 Drawing Figures

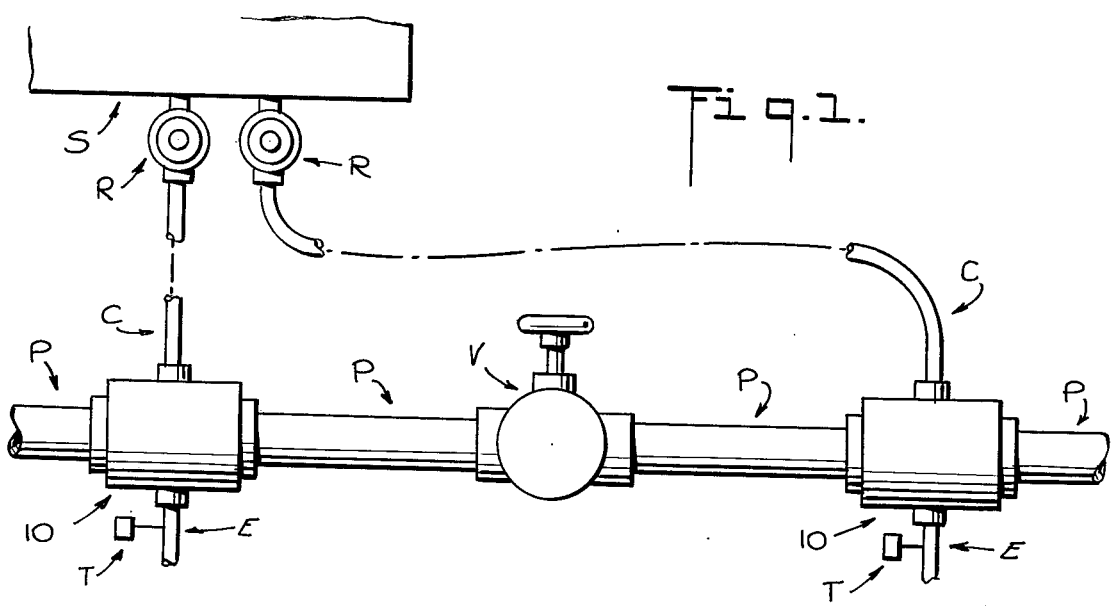
Fig. 1.
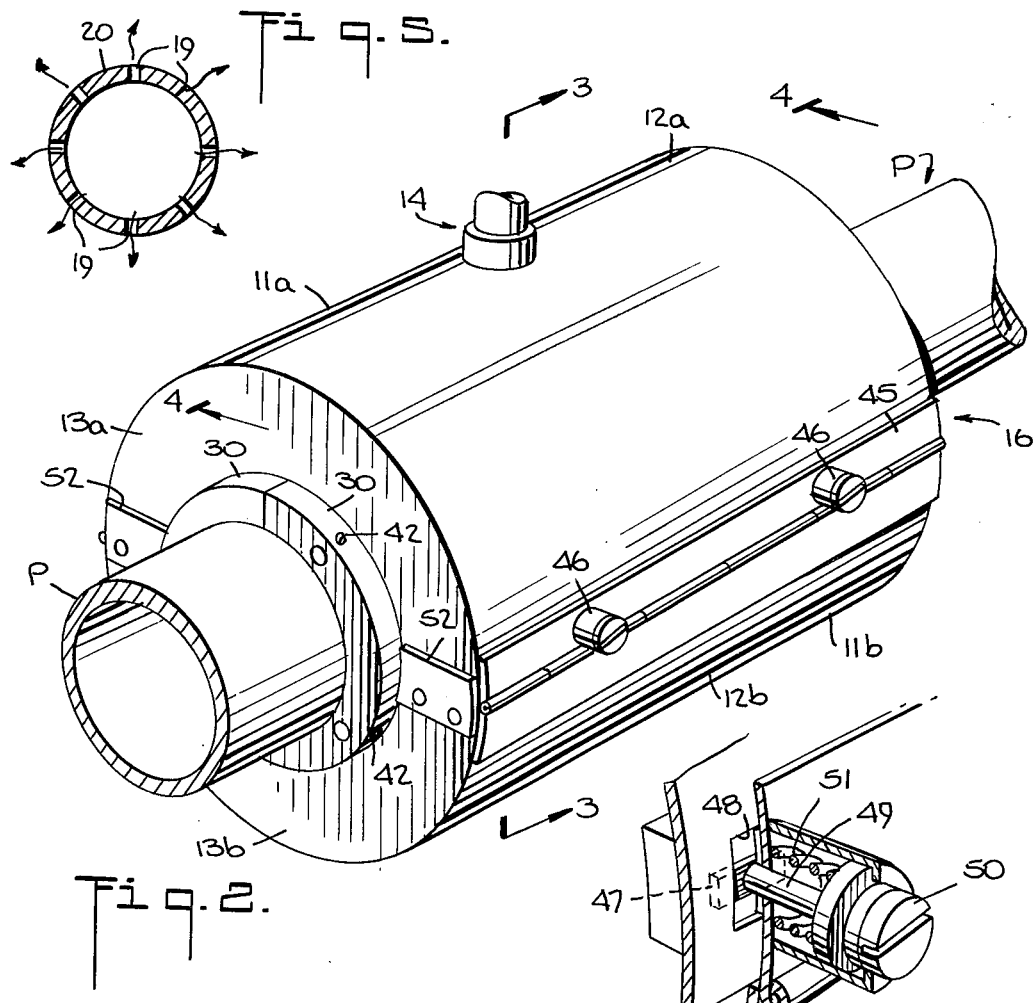
Fig. 5.
Fig. 2.
Fig. 9.

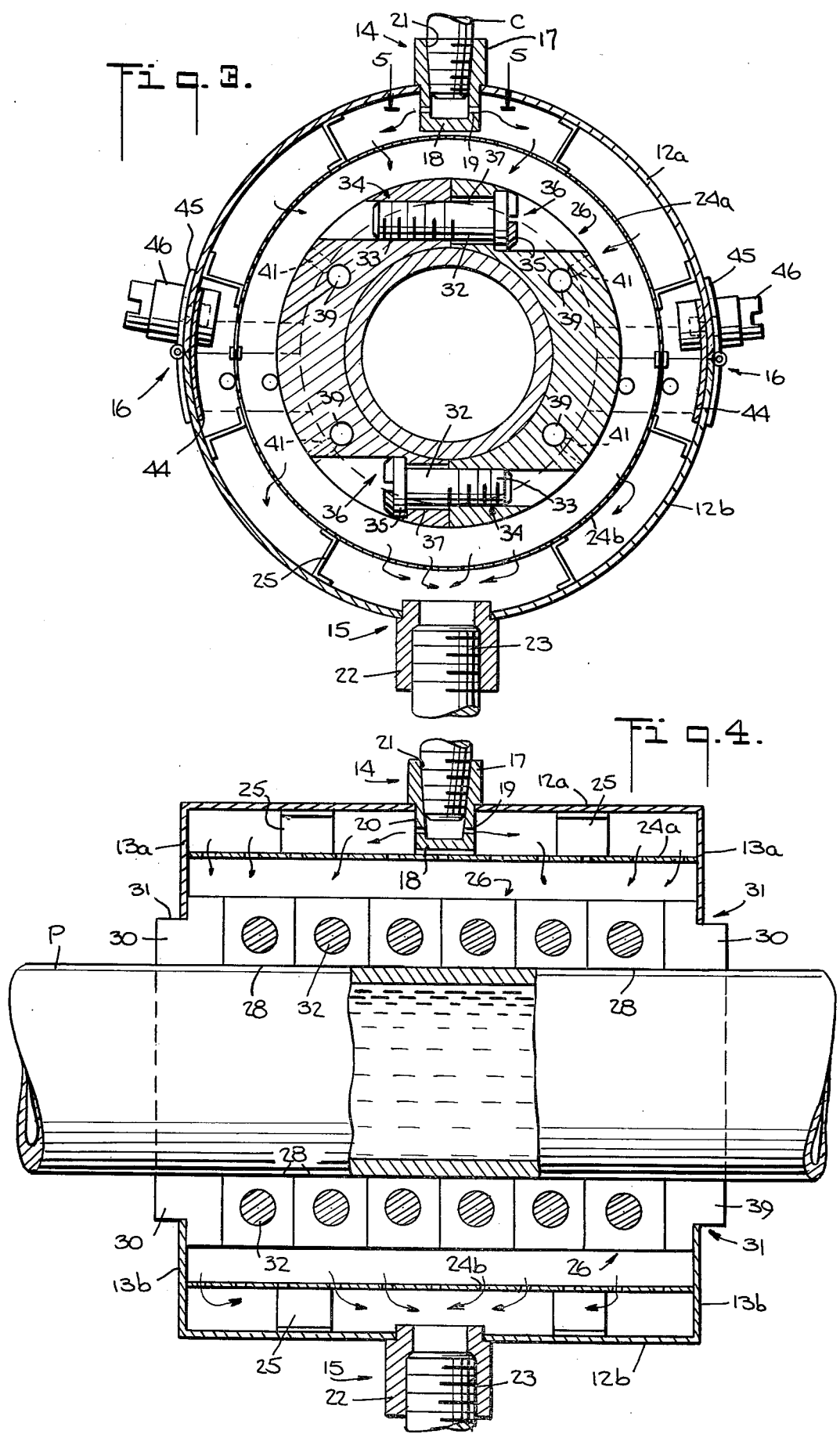

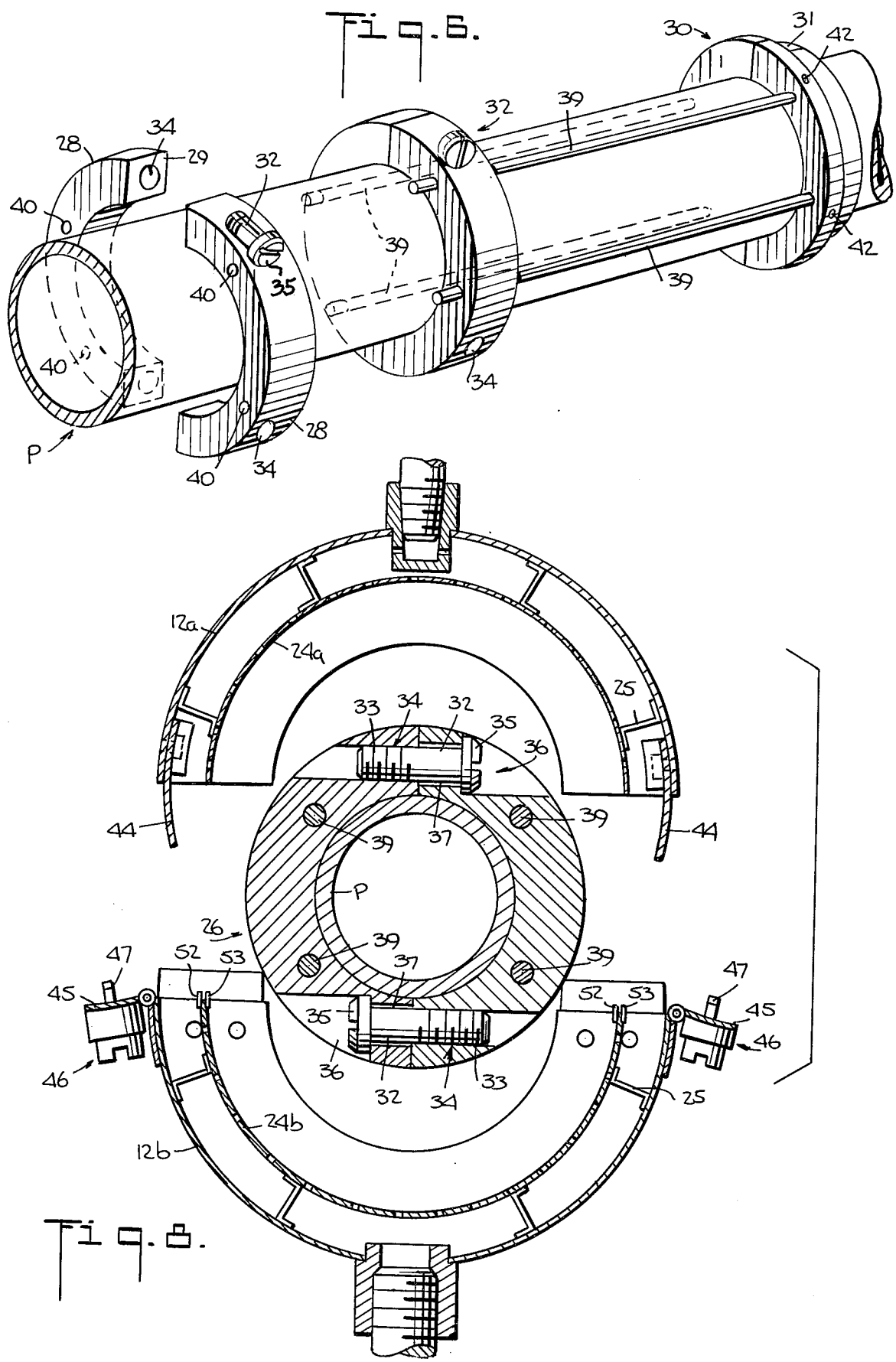

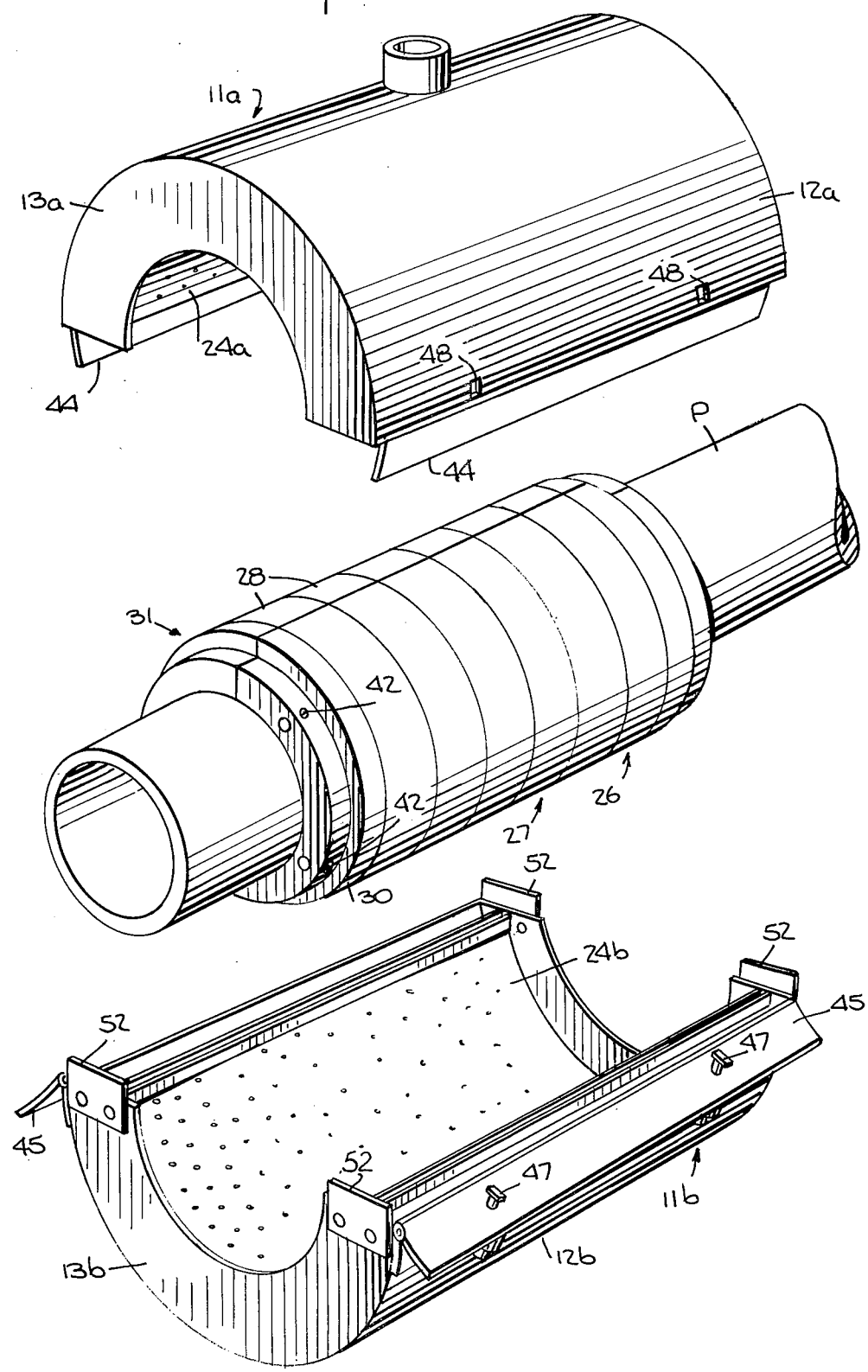

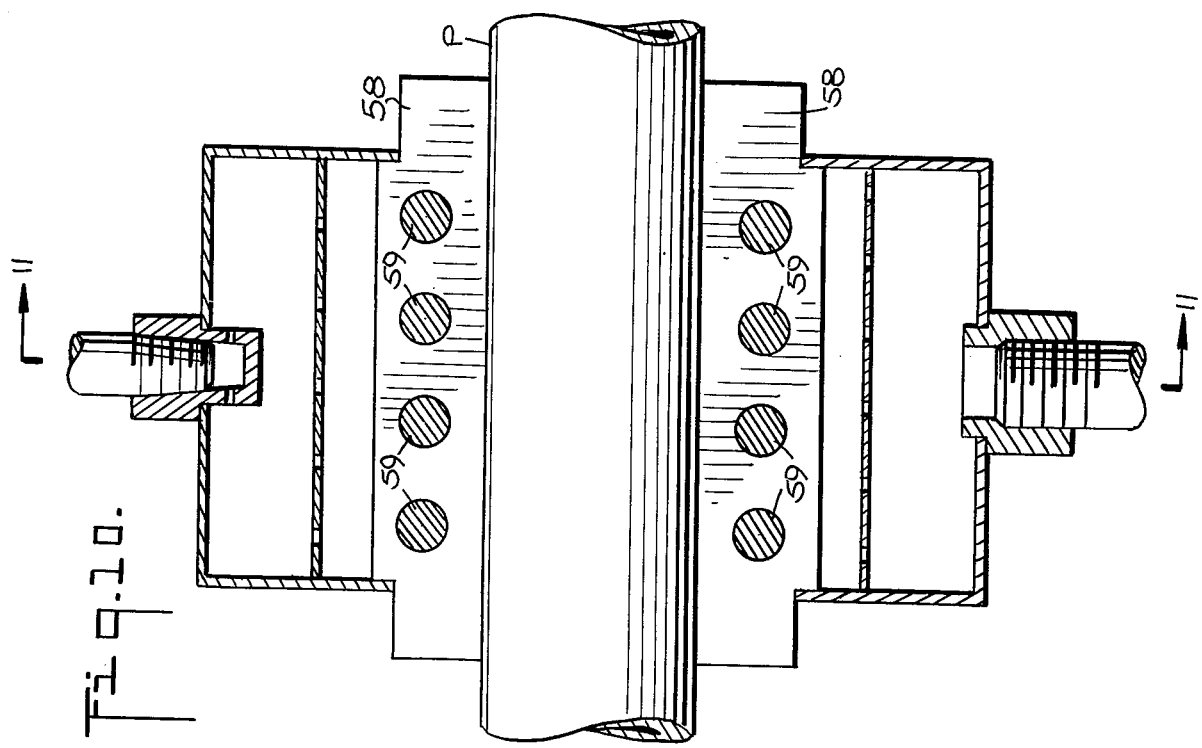
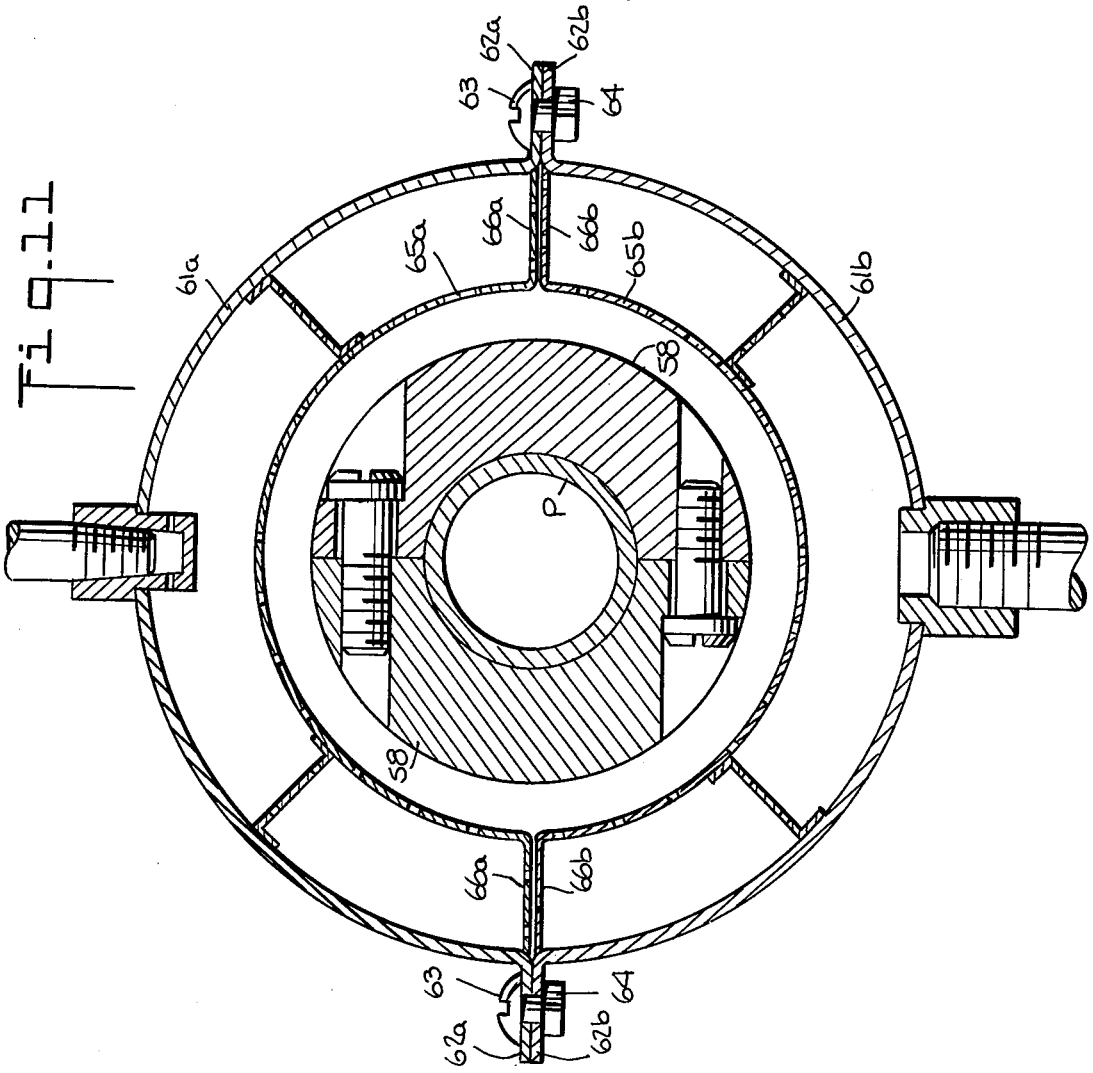

FREEZE ISOLATION SEAL

BACKGROUND OF THE INVENTION

1. Field of the Invention

The invention relates to freezing liquid in a conduit, and more particularly to a method and device for producing a freeze seal by the use of cryogenic gas.

2. Description of the Prior Art

As indicated in U.S. Pat. No. 3,041,850 to Nunn, a known procedure for stopping the flow of water in a pipe line is to freeze water in the line to form a plug. The Nunn patent describes the prior use of solid carbon dioxide, "Dry Ice" to accomplish freezing, and asserts that the use of carbon dioxide gas supplied from a pressure tank to an expansion chamber arranged around a pipe is preferable to the use of a refrigerant in solid form.

Tremont U.S. Pat. Nos. 3,498,071 and 3,623,337 mention the use of liquified air and inert gases such as kypton, argon, neon and nitrogen to freeze liquid in a pipe section and describe a layered pipe jacket in which the liquid refrigerant expands to the gaseous state to effect freezing.

U.S. Pat. No. 3,695,301 to Pittman describes a freeze sealing technique using a body positioned within the pipe as well as an external refrigerant tank containing solid carbon dioxide.

Grise U.S. Pat. No. 3,742,723 relates to a pipe freezing device by causing freezing gas to flow through an annular chamber clamped around the pipe. The chamber can be formed of a split hollow ring, or two hingedly interconnected hollow half rings.

An article in the periodical Electrical World dated Jan. 1, 1975, pages 38–40 entitled "Plug technology adapted for reactor repair" describes the use of liquid refrigerant to form freeze seals at a nuclear power generating station.

The use of freeze seals for large pipes is described in the periodical Pipe Line Industry, March 1977, pages 37–39 in an article entitled "Quick freeze plug reduces testing and repair costs". Liquid nitrogen is said to have proven to be the most effective freezing agent.

The hazards of handling liquid nitrogen are well known, but it appears that prior art techniques have employed liquid nitrogen to take advantage of the fast cooling effect when the nitrogen "flashes" to the gaseous state. However, this flashing does not allow controlled even cooling down of pipes and their contents. Sudden cooling can impose great stresses on pipe wall materials, and the thermal shock caused by exposing a pipe directly to extremely cold boiling nitrogen can damage the pipe wall structure. A rapidly expanding ice plug within the confines of a pipe can exert extreme outward force against the pipe wall. These problems have not been fully solved by the prior art.

SUMMARY OF THE INVENTION

The method and device of this invention overcome some drawbacks of prior freeze sealing techniques by providing a controlled cool down rate while supporting the pipe wall against bulging or other deformation which could damage the pipe. For controlled freezing a metered flow of gaseous cryogenic medium is used as the coolant.

The cryogenic medium does not contact the pipe directly but is fed into and through a housing surrounding a clamp assembly which supports and reinforces the pipe wall against stresses incidental to the formation of a freeze plug.

The preferred cryogenic medium is cold gas, and cold nitrogen at a temperature above the boiling point is particularly preferred for effective, controlled freezing. By introducing the cold gas from a source of fluid under pressure to the housing at a temperature of about $-280°$ F. or higher, depending upon the application conditions, there is no problem of liquifying any ambient air or of severe thermal shock. This process can be described as a "soft approach" which avoids the uncertainties involved in prior techniques in which liquid refrigerants were allowed to flash into the gaseous state at or near the pipe.

The gas is allowed to exit from the housing, preferably through an exhaust port on the opposite side of the pipe from the point at which gas enters the housing, and the temperature of the exhaust gas stream is observed throughout the freezing procedure, permitting control of the rate of cooling of the pipe and of the formation of a freeze plug by metering the flow of gas to the housing, as by operation of a valve on the Dewar flask or other container from which the fluid is supplied, or by means of a valve in the gas supply line.

The clamp assembly which supports the pipe wall within the housing can be formed of two half-annular sections sized to fit tightly about the pipe, but in the presently preferred embodiment a segmented assembly of a plurality of pairs of generally half-annular clamp sections is employed, which more closely fits the pipe section when a freeze seal is to be established.

Between the outer circumferential face of the clamp assembly and the interior wall of the housing there is a space for the flow of gaseous refrigerant, and preferably a baffle arrangement is interposed in this cylindrical space to promote even distribution of the coolant gas so that the clamp assembly, and hence the pipe and its liquid contents are cooled uniformly to produce an ice plug by causing the liquid to freeze radially inward toward the pipe axis. In the presently particularly preferred embodiment the baffle arrangement is constituted by a generally cylindrical apertured plate or screen mounted within the housing so as to be spaced from both the clamp assembly and the housing wall. Cooperating with this baffle arrangement, is a nozzle-like gas inlet member for spreading the flow of gas entering the housing to prevent channelling of the gas flow therethrough from inlet to outlet.

A temperature sensing means is located at the exhaust port or near the exhaust port in association with an exhaust hose for leading exhaust gases away from the work area. Nitrogen gas is non-toxic so no special safety provisions for its removal are required provided there is sufficient ventilation to keep fresh air in the work area. Temperatures employed do not approach the point at which liquification of air is a hazard, since the coldest operating temperatures at the pipe are about $-280°$ F. or higher. The gas flow to the housing can be controlled manually or automatically in response to the exhaust gas temperature detected continuously or from time to time.

This temperature monitoring system permits the cooling down of the pipe at a steady rate, say by $2°$ F. per minute, and the maintenance of a constant freeze temperature, say $-100°$ F. for the time required to perform inspection or repair operations or the like.

Among the applications of the freeze isolation sealing technique of the invention are the cutting off of liquid flow in pipes of sizes ranging from less than an inch in diameter to large diameter pipes. Oil-filled electric cables can also be tested or repaired by stopping the flow of oil therethrough by low-temperature congelation or jelling of the oil. The technique of the invention is of particular interest in connection with power generation stations and especially nuclear power generating facilities, where shut-downs can be extremely costly and where meticulous safety precautions are maintained at all times. In situations requiring scrupulous maintenance of pipe integrity the avoidance of unnecessary shock to the pipe walls afforded by the soft approach of the present invention is highly preferable to prior art techniques.

These and other features and advantages of the method and device of the present invention will be more fully understood from the detailed description of the invention, especially when that description is read with reference to the accompanying drawing figures illustrating a presently preferred embodiment of the invention.

BRIEF DESCRIPTION OF THE DRAWINGS

In the several drawing figures, wherein like reference characters designate like parts throughout:

FIG. 1 shows the application of two freeze seal devices according to the invention to isolate a valve for inspection or repair.

FIG. 2 is an overall view of a freeze seal device fitted on a pipe section.

FIG. 3 is a view in section taken along line 3—3 of FIG. 2 and looking in the direction of the arrows.

FIG. 4 is a sectional view taken along line 4—4 of FIG. 2 and looking in the direction of the arrows.

FIG. 5 is a detail view in section taken along line 5—5 of FIG. 3 and showing the gas inlet nozzle.

FIG. 6 shows the manner of assembly of clamp sections about a pipe in accordance with the invention.

FIG. 7 is a view in perspective with the freeze seal device housing disassembled.

FIG. 8 is a sectional view taken along the axis of a pipe showing how the housing is assembled about the pipe and clamp.

FIG. 9 is a detailed view of a housing fastener with parts cut away to show internal structure.

FIG. 10 is a view in longitudinal section which shows a modified form of the freeze seal device wherein the clamp is not segmented.

FIG. 11 is a view in section taken along line 11—11 of FIG. 10 parallel to the pipe axis.

DETAILED DESCRIPTION OF PREFERRED EMBODIMENTS

Freeze seals in accordance with the invention have a wide variety of applications, and FIG. 1 is illustrative of one such application, in which two freeze seal devices generally designated by the reference numeral 10 are fitted about a pipe section P on opposite sides of a valve V to isolate the valve V and the pipe both upstream and downstream of the valve V from the flow of liquid through the pipe P. When the liquid flow has been stopped by the formation of plugs of frozen liquid at the upstream and downstream locations of the freeze seal devices 10 the valve V can be disassembled or removed for inspection or repair. In FIG. 1 the freeze seal devices 10 are shown to be connected to a source S of cryogenic fluid by means of conduits C, which can be of plain, uninsulated copper tubing. Flow of cryogenic fluid to each of the conduits C is controllable by means of a regulating valve R, shown mounted at the fluid source S. Cryogenic gas escapes from each of the devices 10 through an exhaust hose E, which can be of a suitable length to carry the exhaust gas away from the working area.

The cyrogenic fluid source S is typically a Dewar flask of sufficient capacity to supply enough gas to establish a freeze seal, though more than one flask may be required to produce and maintain the freeze seal or seals for a given application. The cryogenic medium, such as nitrogen, is maintained at a specified pressure and temperature in the self-contained storage Dewar by auto refrigeration. This pressurized fluid is drawn off as required and by the time the cryogenic medium is employed within the device 10 it is in gaseous state, having totally flashed from liquid to gas before reaching the location where the freeze is to be accomplished. Thus uninsulated conduits C, such as plain copper tubes must be used in all applications, and insulated conduits need only be employed when the supply S is quite distant from the place where the freeze seal is to be employed. At distances more than about 25 feet, the conduits C may require some insulation to provide sufficiently low temperatures at the devices 10 for difficult applications.

The exhaust temperature of the cryogenic gas is monitored by a temperature sensor T near the point at which the hoses E are shown connected to the devices 10 in FIG. 1 to permit control of the cool down rate, to maintain a selected temperature once a freeze seal is established, and to permit gradual thawing if desired. The regulating valve R can be coupled with a temperature sensor such as a thermostat at the exhaust, or the regulating valve R can be manually operated by a technician who periodically checks the exhaust temperature.

By controlling the flow of cryogenic medium in response to detected exhaust gas temperatures, that is, by increasing the flow rate to lower the temperature and decreasing the flow rate when the exhaust temperature is too high, controlled freezing is readily accomplished. Different piping materials have different sensitivities to very low temperatures and different susceptibilities to thermal shock. It has been found, for example, that although seamless and welded austenitic stainless steel pipe series A 312-71 can be exposed to temperatures as low as $-325°$ F., other steel pipe materials should not be exposed to such low temperatures, and some, such as 400 series stainless steel pipe and tubing should not be cooled below about $-50$ degrees F. Some carbon and alloy steel pipes and tubes should not be cooled below about $-5°$ F. Prior art techniques which directly expose such pipes to liquid nitrogen at atmospheric pressure at about $-320°$ F. can cause fracture of the pipe materials of varying degrees of severity.

Controlled cooling down is also highly desirable, and it has been found that cooling down to the freeze temperature at a rate of about 2 degrees per minute is especially suitable to produce a freeze plug safely within a reasonable cooling period, building a tough, uniform ice plug without undesirable thermal shock effects.

The method of this invention avoids the use of combustible or toxic refrigerants or auxialliary combustible liquids or gases by employing non-toxic, substantially inert gas, and preferably nitrogen as the cryogenic medium.

Thus, if in the application of FIG. 1, the pipe P is stainless steel, has a nominal diameter of 2½ inches and can withstand a temperature of about −100° F. without structural damage, by maintaining an exhaust gas temperature of about −100° F. a freeze plug can be established in about 2 hours 15 minutes, with an effective cool down rate of about 2 degrees per minute. When a freeze plug has been formed, bands of frost will appear on the pipe P at both sides of the device 10. These bands will be about one inch wide, and thus will be easily observable from a distance. Once the seal is established, maintenance of an exhaust gas temperature of about −100° F. will assure that the seal is secure. After the repair or inspection is completed, the flow of gas can be shut off to permit the ice plug to thaw.

FIGS. 2-4 show a presently preferred form of clamp assembly and housing according to the invention for supporting the wall of a pipe wherein a freeze seal is to be established while cryogenic gas is fed around the pipe for even, controlled freezing. The housing 11 comprises a pair of generally half-cylindrical casing members 11a and 11b, each of which has an outer, generally semi-cylindrical wall designated 12a and 12b respectively for arrangement coaxially about a pipe P. At opposite ends of the housing end members 13a and 13b, formed generally as half rings, extend inwardly from the casing walls 12a and 12b, enclosing a cylindrical space within the housing for the flow of cryogenic gas.

The casing parts 11a and 11b are preferably formed of a grade of stainless steel, resistant to very low temperatures. The overall length of the freeze assembly device is somewhat more than twice the outer diameter of the pipe P about which the housing is assembled. One casing part 11a is provided with one or more inlets 14 for the admission of cryogenic gas under pressure as shown in FIGS. 2-4, and the other casing part 11b has an outlet generally designated 15 for the exhaust of the cryogenic gas. The inlet(s) 14 and outlet(s) 15 are preferably positioned as required in the walls 12a and 12b of the respective casing parts, diametrically opposed to each other when the housing is assembled about a pipe P for even distribution of the gas about the pipe P as shown best in FIG. 3.

FIGS. 2 and 3 also show means generally indicated by reference numeral 16 extending laterally of the housing 11 for preventing cryogenic gas from leaking out of the housing at the lines where the half-cylindrical sections 11a and 11b meet. These leakage prevention means, which cooperate with fasteners for holding the assembled housing 11 together about a pipe, will be discussed more fully in conjunction with FIGS. 7-9, and it suffices here to note that generally leakage of the refrigerant medium is avoided so that the cold gas is most effectively used to cool down the pipe and the pipe contents to be frozen in a uniform manner.

To promote uniform distribution of cryogenic gas the inlet 14 is structured to divert the incoming gas away from the most direct route toward the outlet 15. The inlet structure shown in FIGS. 3 and 4 and in the detail view of FIG. 5 has been found to be particularly effective in dispersing cryogenic gas. A generally cup-shaped fitting 17 having a closed base 18 and a plurality (eight shown in FIG. 5) of equally arcuately spaced gas distributing holes 19 through its side wall 20 is secured, as by welding, in an aperture formed in the casing wall 12a with the gas distributing holes communicating with the interior of the casing 11 and an internally threaded portion 21 of the fitting 17 opening outward for connection of a gas supply conduit C. The interior of the fitting 17 can be tapered as shown in FIGS. 3 and 4 and the exterior can have a step or shoulder for secure assembly. Gas entering the fitting 17 is diverted through the gas distributing holes 19 as illustrated in FIG. 5 to spread throughout the interior of the housing 11.

The exhaust fitting at 15 can be an internally threaded tubular sleeve 22 as shown in FIGS. 3 and 4, welded in a hole through the casing wall 12b and having an axial passage 23 opening directly into the interior of the housing 11. The passage 23 is shown somewhat larger than the entrance passage to allow for a near ambient pressure to exist within the housing 11.

Even distribution of cryogenic gas within the housing 11 is provided in the preferred form of freeze seal device by a perforated sheet of stainless steel or other cold resistant material, arranged coaxially around the pipe and spaced from the pipe and the casing 11. In the drawings this baffle sheet is constituted by a pair of generally semi-cylindrical perforated sheet members 24a and 24b, secured to the semi-cylindrical casing halves 11a and 11b respectively by means of a plurality of spaced fasteners, illustrated as Z-clips 25. After the cryogenic gas is dispersed through the holes 19 the gas flow within the housing 11 is deflected through the perforations of the baffle sheet members 24a and 24b in the manner shown by the arrows in FIGS. 3 and 4, resulting in more uniform gas distribution and slowing the gas flow so that the gas will dwell within the housing 11 long enough to produce highly effective cooling. As illustrated in the several drawing figures, this baffle arrangement of members 24a and 24b is preferably arranged about halfway between the inner surface of the housing 11 and the outer circumferential surface of a pipe clamp assembly which surface is generally designated by reference numeral 26. The cryogenic gas is circulated between the surface 26 and the housing envelope, and does not directly contact the wall of a pipe wherein a freeze seal is to be formed.

In its presently preferred form, the pipe clamp assembly 27 which has the outer cylindrical surface 26, comprises a plurality of generally semi-annular clamp segments 28. The end faces 29 and radial sections through the segments 28 are rectangular or square, so that the assembled segments form a circular cylinder when the end faces 29 of each segment are in opposed adjacent relationship and the several rings formed by the pairs of half-rings 28 are closely packed side by side as shown in FIGS. 4 and 7.

Six identical rings formed of pairs of half-rings 28 are shown in FIG. 4, which also shows that the end segments 30 differ from the other ring members 28 in having a rectangular circumferential step provided at 31 for close seating of the housing end members 13a and 13b, which extend radially inward further than the clamp surface 26, against the steps at 31 of both ends of the clamp assembly 27. This close fitting relationship is a further gas leakage prevention measure.

The ring segments 28 and 30 fit closely about the pipe wall and prevent swelling, bulging or other deformation of the pipe.

Although six pairs of half-rings 28 are illustrated in the drawings, the number of such pairs of half-rings can be greater or less than six, depending upon the application. The use of a plurality of half-rings 28 results not only in a closer fit about a pipe, but in easier fabrication, since the clamp assembly 27 is preferably made of hard, cold resistant steel, and it is easier to manufacture the half-rings 28 than to bore an elongated axial cylindrical hole through a solid block of such material.

The close contact between the internal surfaces of the half-rings 28 and the pipe wall not only protects the pipe from deformation, but also provides for good heat conduction from the pipe to and through the clamp assembly 27 to the cryogenic medium flowing within the housing 11. The tightly fitted clamp assembly 27 does not permit direct contact of the cryogenic gas with the pipe wall, but does effectively transfer heat for the formation of an ice plug within the pipe.

The half-rings 28 of each complete ring are shown to be interconnected and tightly secured together about a pipe by pairs of screws 32 best shown in FIGS. 3, 4, 6 and 8 as passing through mutually aligned bores arranged perpendicular to the end faces 29 of the half-rings 28. The half-rings 28 are preferably identical, so that half-rings 28 of each clamp segment are merely reversed with respect to each other for reception of a threaded end portion 33 of each of the two screws 32 in an internally threaded bore at 34 of each half-ring 28, while a flat head portion 35 of each screw 32 is recessed in a cut out step at 36 of the end portion of the half-ring 28 opposed to the portion of the other half-ring 28 opposed to the portion of the other half-ring having the threaded bore 34, as shown in FIGS. 3 and 8. The bore hole at 37 arranged for alignment with the internally threaded bore 34 can be smooth and slightly larger in diameter than the shank portion to the screw 32 to allow the half-rings 28 to grip the pipe very closely despite any minor irregularities in the contour of the pipe wall.

The end segments 30 are shown without bore holes and interconnecting screws in the embodiment shown in the drawing, but these segments can also be fastened together by similar means if desired. As shown in the drawings, the interfitting relationship of the step 31 of each end segment with the housing end members 13a and 13b can be a clamping fit.

The manner of installation of the clamp assembly 27 about a pipe section P is illustrated in FIG. 6, which shows elongated rod-like members 39 extending parallel to the pipe axis through aligned lateral holes 40 of the half-rings 28 and end ring segments 30 to join the separable parts of the clamp assembly 27 longitudinally of the pipe P. Four of the rod-like members 39, positioned at substantially equal arcuate spacings of about 90° about the pipe P are shown in FIG. 6, but a greater or lesser number of longitudinal connectors can be employed for various applications depending upon pipe diameter and other factors. The end segments 30 have bore holes at 41 extending radially outward from the locations of the rod-like members 39 for securing ends of the members 39 by means of set screws 42, as shown in FIGS. 3, 6 and 7.

Thus installation can proceed as shown in FIG. 6 by sliding half-rings 28 along the longitudinal rod-like members 39 into side by side positions about the pipe P with the screws 32 loosely in place, and then tightening down on the set screws 42 at the end segments 30 and tightening the half-ring interconnecting screws 32 when all of the clamp assembly segments are in place about the pipe to achieve the assembled relationship of the clamp assembly 27 illustrated in FIG. 7. It will be recognized that various different kinds of fasteners could be used, and that the drawings illustrate the presently preferred fastening means.

The casing parts 11a and 11b, with their internal baffle means 24a and 24b are then fitted about the clamp assembly 27. FIG. 7, illustrates that the casing parts 11a and 11b are preferably oriented with respect to the clamp assembly 27 so that the half-rings 28 meet along lines spaced away from the mating side edges of the casing parts 11a and 11b. As shown in FIGS. 7 and 8, although the casing walls 12a and 12b are semi-cylindrical, they are preferably provided with means previously generally designated 16 to overlap and seal the longitudinal joining lines between the housing parts 11a and 11b. For this sealing purpose, one housing part, shown as the part 11a (although the arrangement could be reversed) has generally circumferentially extending flanges 44 secured at the inner lateral edges of its side wall 12a and extending past the diametral line of the assembled housing to fit closely within the opposed side edges of the wall 12b of the other housing part 11b, as shown in FIGS. 3, 7 and 8. The other housing part 11b has a pair of longitudinally extending flaps 45, mounted to pivot about the longitudinal edges of the casing wall 12b, so as to overlie the edges of the wall 12a, also as shown in FIGS. 3, 7 and 8. The flaps 45 are shown to carry fasteners generally designated by reference numeral 46, and shown in detail in FIG. 9 for securing together the two housing parts 11a and 11b. Although four fasteners 46 are illustrated, two at each side of the device are shown, some other number, such as one fastener at each side, or more than two, can be employed.

The presently preferred form of fastener 46, as shown in FIG. 9, has an inwardly projecting rectangular head 47 for fitting through a slot 48 in the opposed casing wall 12a. When the head 47 is rotated about its shaft 49, to the position of FIG. 9, as by turning the slotted outer end member 50 the fastener is locked in place, and held firmly by the spring 51 under compression. These fasteners 46 are presently preferred for their easy locking and unlocking, but other kinds of fasteners such as screws, or straps extending around the housing, could be used.

The ends of housing part 11b are also shown to be provided with pairs of flanges 52 extending beyond the end wall 13b to overlie the end wall 13a of the housing part 11a for sealing against leakage at the ends of the device. The installed device is illustrated in FIG. 2, with all joints sealed in the manner described above.

Interfitting tongue and groove means are also preferably provided on the baffle sheet members 24a and 24b by securing a pair of spaced longitudinal flanges 52 and 53 along each straight edge of the perforated sheet 24b to extend past the edges of the sheet 24a and to receive those edges between the members 52 and 53 when the housing parts 11a and 11b are in the assembled condition of FIG. 2.

FIGS. 10 and 11 illustrate a simpler embodiment of freeze seal device which does not provide the advantages of the longitudinally segmented clamp assembly 27. In the device of FIGS. 10 and 11, which is intended for use primarily with small diameter pipes wherein deviations caused by variation in the outer diameter of the pipe or by pipe sections being "out of round" or somewhat elliptical are not so serious as for pipes of larger diameter, the pipe is clamped between a pair of elongated, generally cylindrical clamp members 58, secured together by a plurality of pairs of screws 59, each screw 59 being mounted similarly to the screws 32 in the embodiment of FIGS. 1-9. Housing parts 61a and 61b, instead of having the leakage prevention means described in conjunction with the embodiment of FIGS. 1–9, simply have mating lateral flanges 62a and 62b secured together by screws 63 and nuts 64. There is an internal baffle formed by semi-cylindrical perforated sheet members 65a and 65b, mounted by means of Z clips. The baffle members 65a and 65b have radially extending lateral flanges 66a and 66b respectively facing each other along the device's diametral plane in the assembled condition shown in FIGS. 11 and 12.

The device of the invention has been described in terms of freezing a plug of ice to stop the flow of water in a pipe, but it should be understood that applications are not limited to water pipes. The device and method of the invention can also be used effectively to cause oil to gel or congeal in a pipe or in an oil-filled electric cable, and other liquids or mixtures of liquids can also be frozen or caused to gel or congeal in conduits in accordance with the invention.

Various other modifications, substitutions of parts or materials, adaptations and applications of the device and method of the invention will suggest themselves to those acquainted with the art and are considered to be within the spirit and scope of the invention.

What is claimed is:

1. A device for freezing liquid in a conduit by the use of a cryogenic fluid comprising a clamp assembly sized for fitting closely about and gripping a conduit wherein liquid is to be frozen to support the conduit throughout the length of a conduit section wherein the liquid is to be frozen whereby deformation of the conduit under internal pressure is precluded, said clamp assembly also preventing direct contact between the conduit and the cryogenic fluid, and a housing adapted to surround the clamp assembly and to define a space between the clamp assembly and the housing for the flow of the cryogenic fluid, the housing having an inlet and an outlet for cryogenic fluid.

2. The device of claim 1 wherein the clamp assembly, when assembled about a conduit extends around substantially the entire perimeter of the conduit, and wherein the clamp assembly consists of a plurality of segments.

3. The device of claim 2 wherein the clamp assembly segments each extend only partially around the perimeter of a conduit when assembled.

4. The device of claim 2 wherein the clamp assembly segments are generally semi-cylindrical.

5. The device of claim 2 wherein the clamp assembly comprises one pair of generally semi-cylindrical segments.

6. The device of claim 2 wherein said segments are arranged in contiguous, side-by-side relationship in the direction of the conduit.

7. The device of claim 1 wherein the housing comprises a pair of generally semi-cylindrical parts, and a generally semi-cylindrical, perforated baffle element is mounted within each of said housing parts.

8. The device of claim 1 and including baffle means adapted for interposition between said housing and said clamp assembly.

9. The device of claim 9 wherein said baffle means comprises a perforated sheet.

10. The device of claim 1 wherein said inlet includes nozzle means for dispersing a flow of cryogenic fluid within the housing.

11. A device for freezing liquid in a conduit by the use of a cryogenic fluid comprising a clamp assembly which comprises a plurality of pairs of generally semicylindrical segments which when assembled about a conduit extend around substantially the entire perimeter of the conduit, said clamp assembly fitting closely about the conduit to support the conduit while preventing direct contact between the conduit and the cryogenic fluid, and a housing adapted to surround the clamp assembly and to define a space between the clamp assembly and the housing for flow of the cryogenic fluid, the housing having an inlet and an outlet for cryogenic fluid.

12. The device of claim 6, and including means for fastening said pairs of generally semi-cylindrical member together to produce generally cylindrical segments for encircling a conduit wall, and means for interconnecting a plurality of generally cylindrical segments to produce a substantially uniform cylinder.

13. The device of claim 12, wherein the means for fastening pairs of members together comprise pairs of screws adapted to fit in bores extending along mutually parallel, spaced chords with respect to the cylindrical segments.

14. The device of claim 12, wherein the means for interconnecting generally cylindrical segments comprise rod-like members adapted to extend longitudinally through aligned apertures defined in said segments.

15. The device of claim 14 and including means for securing said rod-like members near opposed ends of the assembled cylinder.

16. A method of freezing liquid in a conduit comprising enclosing a section of the conduit within a tightly fitting clamping means for supporting the pipe wall against deformation under internal pressure and shielding the conduit, surrounding the clamping means with a housing spaced from the clamping means, and introducing a cryogenic fluid between said housing and said clamping means, and allowing cryogenic fluid to leave the housing.

17. The method of claim 16 wherein the cryogenic fluid is introduced into the housing as a gas.

18. The method of claim 16 wherein the cryogenic fluid is introduced into the housing as a gas, and including monitoring the temperature of gas leaving the housing and adjusting the rate of introduction of gas accordingly to control the rate of cooling of the liquid.

19. The method of claim 16 and including causing the cryogenic fluid to disperse within the housing for uniformly removing heat from said clamping means.

20. The method of claim 16 wherein the cryogenic fluid is introduced at a temperature above the temperature of liquification of air.

21. A method for freezing liquid in a pipe comprising assembling a pipe clamp by joining together a plurality of clamp segments about a section of pipe to fit tightly around the pipe wherein liquid is to be frozen and supporting the pipe against deformation under internal pressure by means of said clamp, assembling a substantially leak proof housing surrounding said pipe clamp, introducing a controllable flow of cold gas into said housing for removing heat from said clamp and hence indirectly removing heat from said liquid, allowing heated gas to exit from said housing, sensing the temperature of heated gas near a point of exit from the housing, and controlling the rate of flow of gas into the housing in response to the temperature of the heated gas sensed.

22. The method of claim 21 and including maintaining the temperature of the gas exiting from said housing at a substantially constant temperature.

23. The method of claim 22 and including maintaining the temperature of the gas exiting from the housing at a substantially constant temperature which is considerably higher than the temperature at which material of which the pipe is made is subject to thermal damage.

24. Apparatus for freezing liquid in a conduit by the use of a cryogenic fluid comprising a clamp assembly for fitting tightly about a conduit wherein liquid is to be frozen to support the conduit against deformation under internal pressure while preventing direct contact between the conduit and the cryogenic fluid, a housing adapted to surround the clamp assembly and to define a space between the clamp assembly and the housing for flow of the cryogenic medium, the housing having an inlet adapted for connection to a supply of cryogenic fluid, an outlet for the exhaust of cryogenic fluid, and means for sensing the temperature of exhaust cryogenic fluid near said outlet.

25. The apparatus of claim 24 and including means for varying the flow of cryogenic fluid in response to the temperature sensed.

* * * * *

UNITED STATES PATENT AND TRADEMARK OFFICE
CERTIFICATE OF CORRECTION

PATENT NO. : 4,267,699
DATED : May 19, 1981
INVENTOR(S) : Harry H. Bahrenburg

It is certified that error appears in the above-identified patent and that said Letters Patent are hereby corrected as shown below:

Column 9, line 62, after "of" and before "wherein", change "claim 9" to --claim 8--;

Column 10, line 11, after "of" and before "and" change "claim 6" to --claim 11--.

Signed and Sealed this

Twenty-eighth Day of July 1981

[SEAL]

Attest:

Attesting Officer

GERALD J. MOSSINGHOFF

Commissioner of Patents and Trademarks